(12) United States Patent
Hehle et al.

(10) Patent No.: US 9,140,160 B2
(45) Date of Patent: Sep. 22, 2015

(54) ENCAPSULATED EXHAUST GAS AFTERTREATMENT UNIT

(75) Inventors: Marc Hehle, Constance (DE); Hans Sudmanns, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 884 days.

(21) Appl. No.: 13/264,820

(22) PCT Filed: Apr. 12, 2010

(86) PCT No.: PCT/EP2010/002240
§ 371 (c)(1),
(2), (4) Date: Jan. 3, 2012

(87) PCT Pub. No.: WO2010/118845
PCT Pub. Date: Oct. 21, 2010

(65) Prior Publication Data
US 2012/0102928 A1    May 3, 2012

(30) Foreign Application Priority Data

Apr. 16, 2009   (DE) .......................... 10 2009 017 684

(51) Int. Cl.
| | |
|---|---|
| *F01N 3/24* | (2006.01) |
| *F01N 3/10* | (2006.01) |
| *F01N 3/00* | (2006.01) |
| *B01D 53/94* | (2006.01) |
| *F01N 13/00* | (2010.01) |
| *F01N 3/035* | (2006.01) |
| *F01N 3/08* | (2006.01) |
| *F01N 3/20* | (2006.01) |
| *F01N 13/18* | (2010.01) |

(52) U.S. Cl.
CPC .............. *F01N 3/035* (2013.01); *F01N 3/0821* (2013.01); *F01N 3/2066* (2013.01); *F01N 13/0097* (2014.06); *F01N 13/017* (2014.06); *F01N 13/1894* (2013.01); *F01N 2450/30* (2013.01); *F01N 2590/08* (2013.01); *F01N 2610/1453* (2013.01); *Y02T 10/24* (2013.01)

(58) Field of Classification Search
None
See application file for complete search history.

(56) References Cited

U.S. PATENT DOCUMENTS

| | | |
|---|---|---|
| 2,853,367 A | 9/1958 | Karol et al. |
| 3,996,016 A | 12/1976 | Wagner |
| 2002/0073666 A1 | 6/2002 | Cutler et al. |
| 2006/0153748 A1 | 7/2006 | Huthwohl et al. |
| 2006/0156712 A1 | 7/2006 | Buhmann et al. |
| 2007/0144126 A1* | 6/2007 | Ohya et al. ..................... 55/502 |

FOREIGN PATENT DOCUMENTS

| | | |
|---|---|---|
| DE | 202006011281 U1 | 9/2006 |
| DE | 202007004230 U1 | 7/2008 |
| WO | WO-9523918 A1 | 9/1995 |
| WO | WO-03069138 A1 | 8/2003 |
| WO | WO-2008086445 A1 | 7/2008 |

* cited by examiner

*Primary Examiner* — Walter D Griffin
*Assistant Examiner* — Jelitza Perez
(74) *Attorney, Agent, or Firm* — Fishman Stewart Yamaguchi PLLC

(57) ABSTRACT

Exhaust gas aftertreatment units are provided. The units have an encapsulated design that is constructed in a modular manner from disk-shaped components. Exhaust gas flow occurs in the direction of a disk plane, wherein the components are surrounded by frames that are consecutively, in particular elastically, connected and clamped to each other transverse to the disk plane.

30 Claims, 13 Drawing Sheets

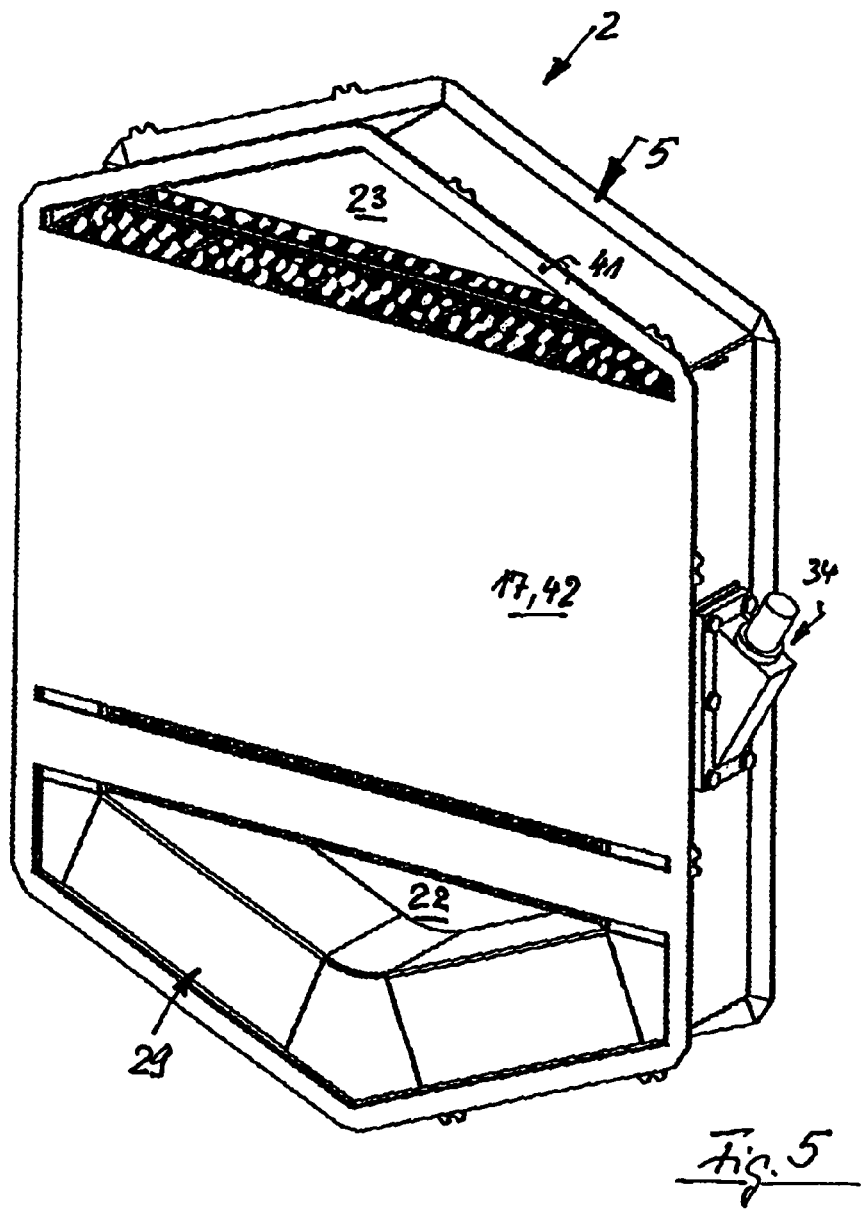

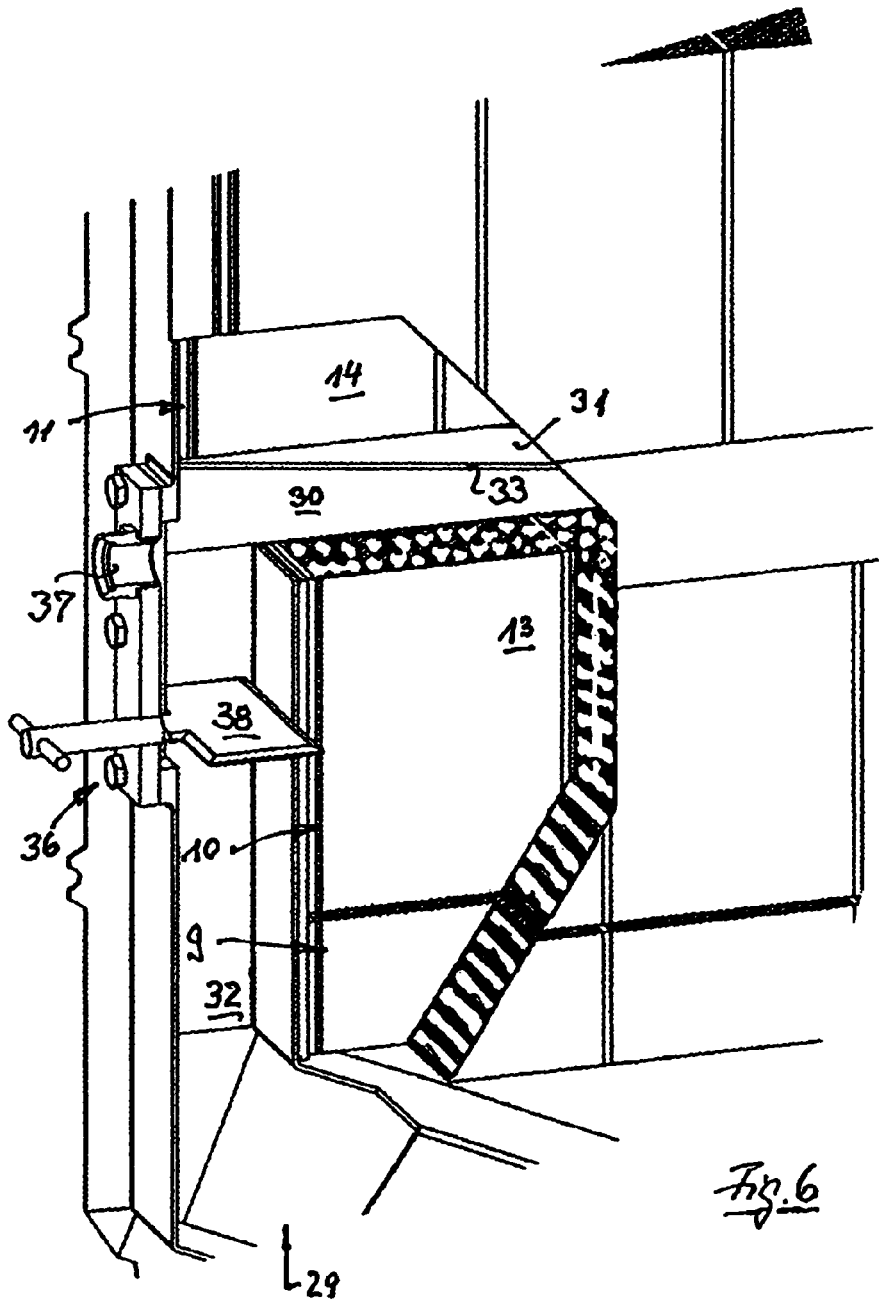

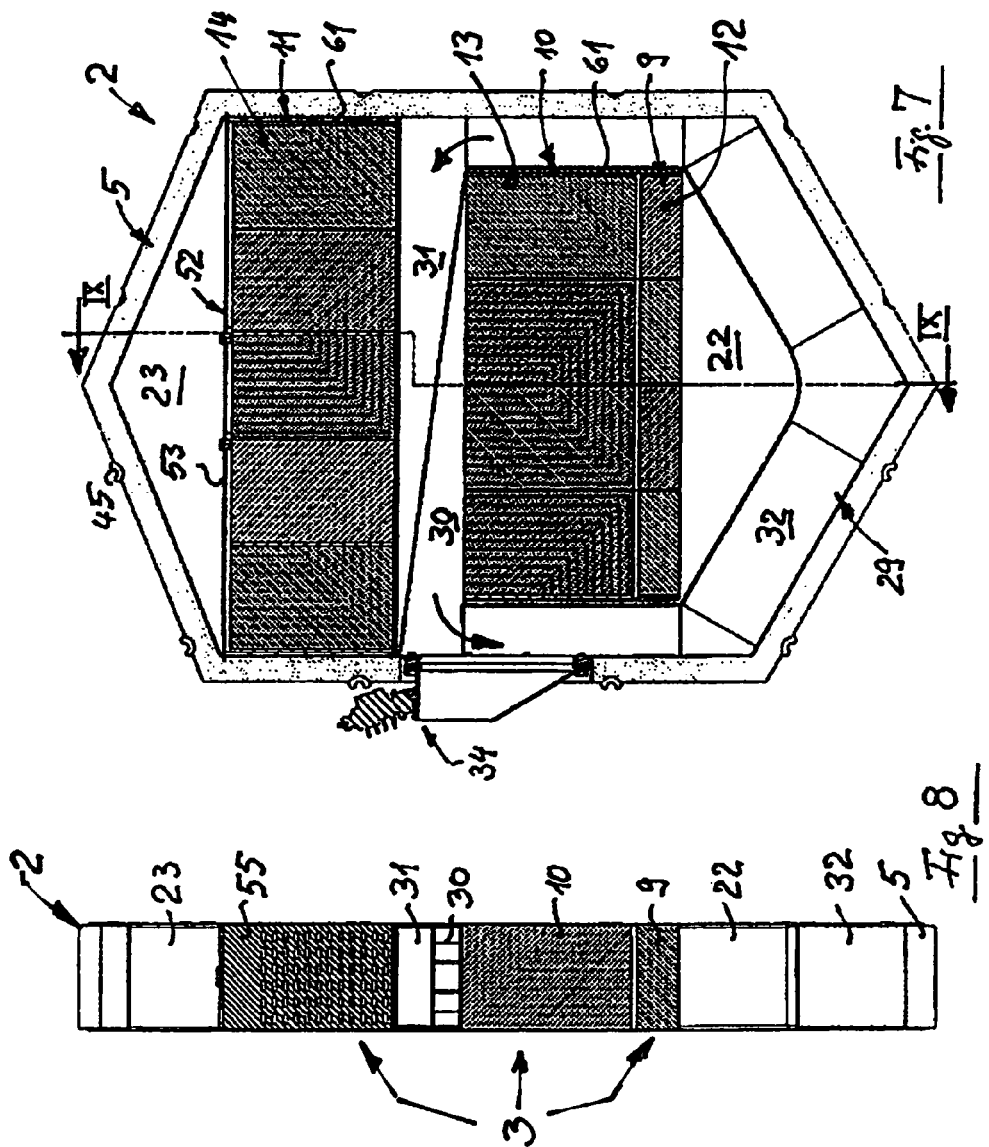

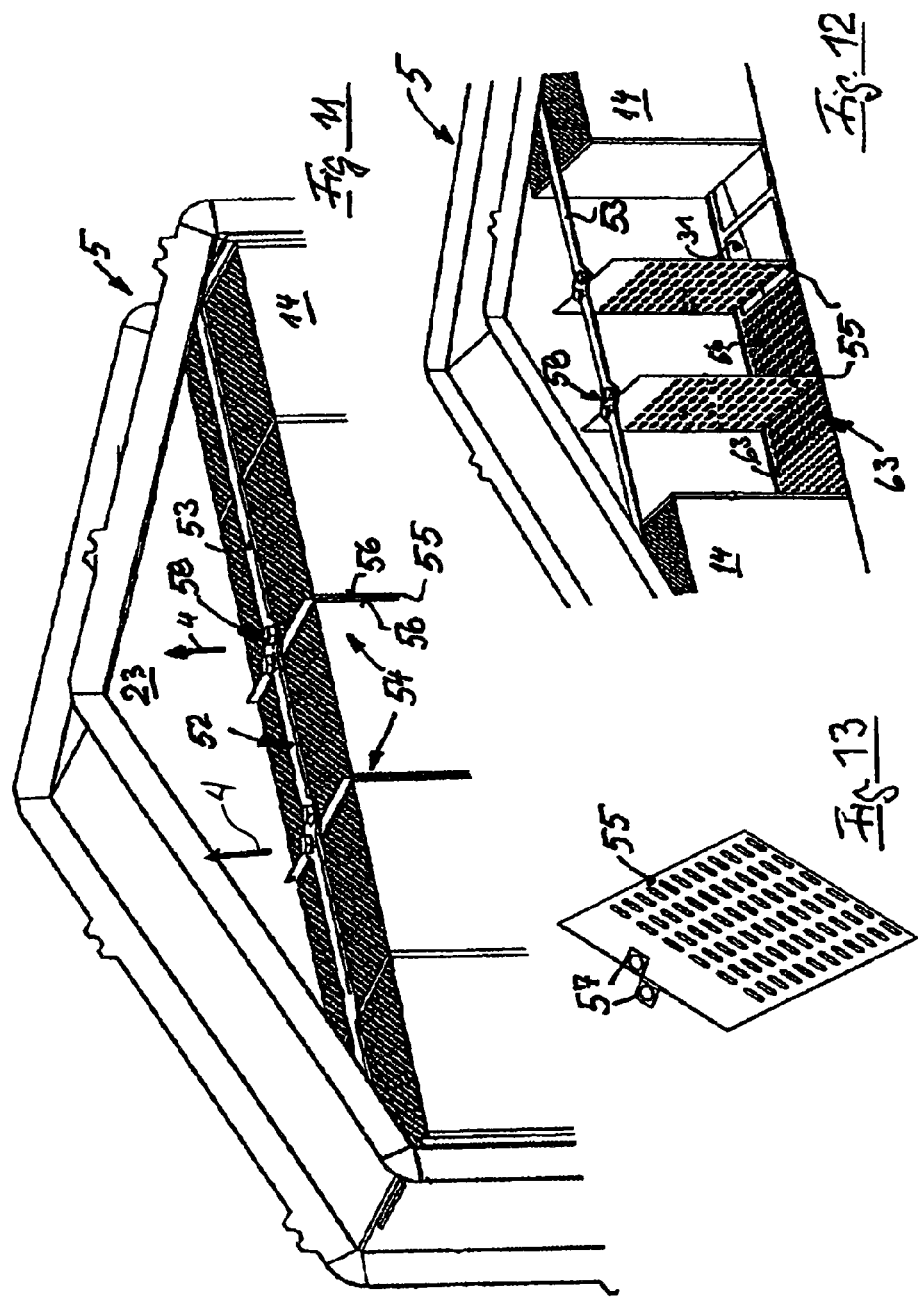

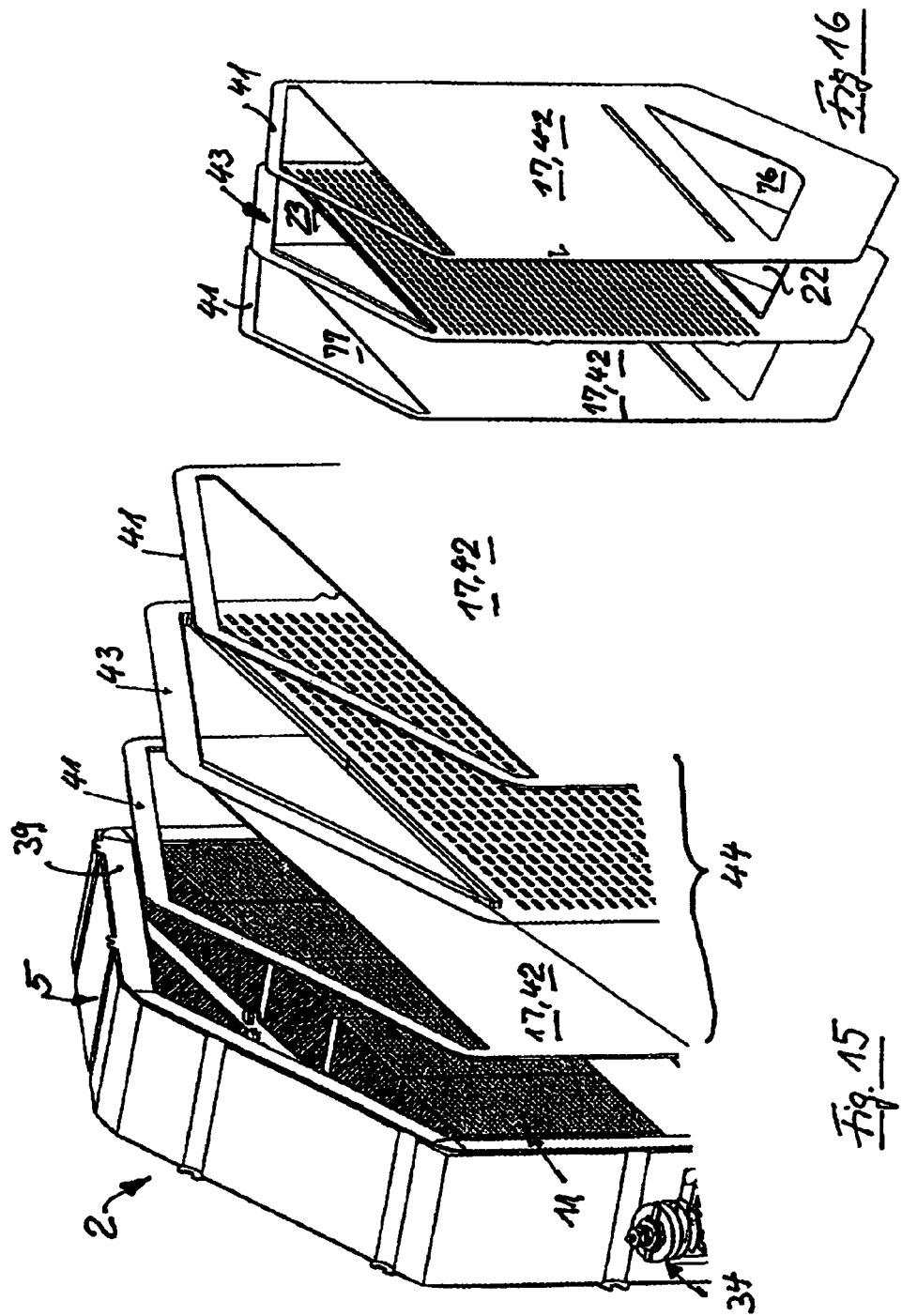

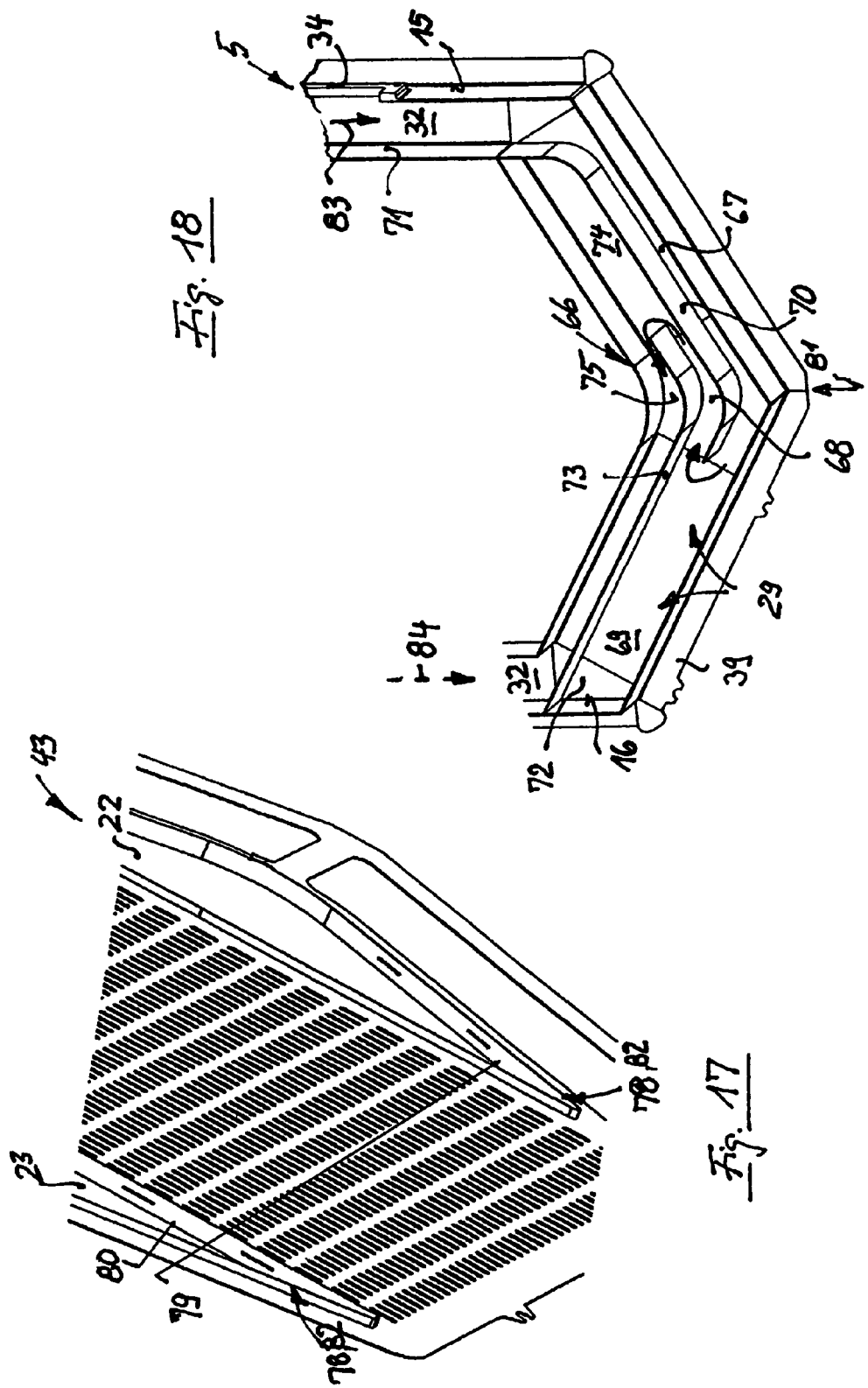

ENCAPSULATED EXHAUST GAS AFTERTREATMENT UNIT

CROSS-REFERENCE TO RELATED APPLICATIONS

This application claims priority to German patent applications DE 2009 017 684.5 filed on Apr. 16, 2009 and PCT application PCT/EP2010/002240 filed on Apr. 12, 2010, which are hereby incorporated by reference in their entireties.

TECHNICAL FIELD

The disclosure relates to an encapsulated exhaust gas aftertreatment system.

BACKGROUND

Various embodiments of encapsulated aftertreatment systems for exhaust gases in particular of internal combustion engines of motor vehicles, especially utility vehicles have been disclosed. The disclosure includes exhaust gas aftertreatment units combined to a single unit within a case having joint supply connections on the case side for these exhaust gas aftertreatment units which in turn are at least partially designed encapsulated within the unit. This does not only result in considerable construction expenses for the system and a relatively large space requirement. In fact, the adjustment to different cases of application, such as the adjustment to internal combustion engines of different sizes with different volume flows flowing through the exhaust gas aftertreatment system also requires separately set up aftertreatment systems with units combined within the latter and designed accordingly.

Said encapsulated aftertreatment system has been disclosed for example in DE 102 50 050 A1. In it, in part separate enclosures are again provided and required within the aftertreatment system encapsulated with a separate case having supply connections on the case side for the exhaust gas aftertreatment units combined in the unit to achieve the flow through the exhaust gas aftertreatment units in the desired order.

The supply connection on the flow side with the supply connections arranged axially opposite from each other leads into an inflow chamber, from which the flow is directed at a downstream, ring-shaped particle filter designed for radial flow-through via oxidation catalysts designed for axial flow-through. From the particle filter, the exhaust gas flows onto a central collection pipe radially on the inside, onto which urea is injected and which retains a hydrolysis catalyst, if applicable. The collection pipe leads into a redirection chamber from which the flow through the SCR catalysts arranged around the collection pipe occurs converse to the collection pipe, said SCR catalysts leading into a ring-shaped redirection area adjacent to the particle filter separated from the particle filter. From said redirection area, the exhaust gas flows into a ring-shaped area interspersed with SCR catalysts surrounding the collection pipe. The ring-shaped area is connected with the supply connection axially opposite the supply connection on the exhaust gas side and, relative to the case encapsulating the system, to the supply connection on the flow side.

Another embodiment of an encapsulated exhaust gas aftertreatment system has been disclosed in U.S. Pat. No. 3,996,016A. As implied in the preamble of claim 1, said exhaust gas aftertreatment system has a modular design with disk-shaped assemblies. The exhaust gas aftertreatment units are designed in ring shape and are arranged encircling a central supply channel in axial succession and axially separated from each other. The ring-shaped exhaust gas aftertreatment units are radially traversed starting from this supply channel and are enclosed by a ring-shaped collection channel radially on the outside. Said collection channel leads to a connecting space arranged coaxially in extension of the supply channel and is connected to an outflow pipe via the latter; said outflow pipe running in axial extension of the supply channel.

With said modular design of the exhaust gas aftertreatment system consisting of disk-shaped assemblies traversed in the direction of the disk plane and connected consecutively with each other diagonally to the disk plane, the stringing together of the modules creates the condition for designing an exhaust gas system that matches the number of cylinders of the internal combustion engine for different conversion rates and exhaust gas back pressures. This is also possible with the number of assemblies combined into modules of the exhaust gas aftertreatment system alone, without making any changes to the design of said assemblies and at least without making basic changes to the combination of the assemblies to create the exhaust gas aftertreatment system.

Another design of an exhaust gas aftertreatment system has been disclosed in DE 20 2007 004 230 U1. In it, exhaust gas aftertreatment units of different functions arranged in succession in an axial direction and axially traversed are provided. They are supported by means of support rings in a common case at a stable position to each other. The common pipe-shaped case consists of the pipe sections arranged in succession in an axial direction corresponding to the exhaust gas aftertreatment units. Said pipe sections retain one of the exhaust gas aftertreatment units each and their axially opposed buffer areas are surrounded by strap retainers and they are connected to the system in a stable and sealing position by means of said strap retainers.

SUMMARY

An object of the disclosure is to allow the flexibilization of the function and design by conserving the modular design to match the respective operating requirements, including the size of the exhaust gas flow to be processed by the respective system, namely under favorable conditions for the simplified manufacture, the conduct of maintenance and installation work and, to the extent necessary, the thermal delimitation of the respective exhaust gas aftertreatment units, with an overall lightweight but stable design of the encapsulating case.

The basic conditions for the above are created with the properties of claim 1, making it possible to design the exhaust gas aftertreatment units preferably with block-like functional elements, wherein said functional elements are arranged in succession after each other in rows diagonally to the flow-through direction in the disk plane and preferably have identical functions.

Based on the above, an embodiment of an exhaust gas aftertreatment system is also possible by combining different functional elements, in particular for example an oxidation catalyst, a soot particle filter and a nitrogen oxide catalyst in a disk-shaped assembly functionally arranged behind each other.

With respect to the set up of the respective assemblies and in view of the connection of said assemblies to an exhaust gas aftertreatment system, it has been shown to be convenient that the respective assembly comprises a frame forming part of the encapsulation of the exhaust gas aftertreatment system.

This makes it possible in a simple way to clamp the functional elements in the direction of the respective rows between opposite frame sides, wherein the functional elements are positioned diagonally to the disk plane, preferably at least almost flush with the fronts of the respective retaining frame. This way, the functional elements extend in a joint plane with the surrounding frame, so that the corresponding functional elements of the successive assemblies are also braced on each other diagonally to the disk plane if the frames are braced diagonally to the disk plane—to form the encapsulation. Ceramic substrates or basic metal objects are used in particular as functional elements.

For clamping together the frames diagonally to the disk plane, clamping connections without interfering with the units are preferably used, in particular clamping connections overlapping on the circumference of the assemblies. This makes it possible in particular to design the encapsulation, i.e., the case of the exhaust gas aftertreatment system by means of the frames of the assemblies. The frames are preferably flexibly braced against each other diagonally to the disk plane with a sealing connection, which also allows the equalization of heat-related expansions of the exhaust gas system.

Conveniently, the bracing of the assemblies forming the modules is achieved with tension rods extending diagonally to the disk plane, which are preferably positioned overlapping on the circumference of the frames. Due to the fact that the tension rods are extending outside the frames, the tension rods are essentially unaffected by the operation-related temperature fluctuations of the exhaust gas system and remain cold.

The tension rods are braced against the cover parts in the direction of pull; said cover parts cover the front of the terminal assemblies of the respective exhaust gas aftertreatment system parallel to the disk plane. The cover parts preferably extend at least on the surface of the inner side facing the modules parallel to the disk plane and conveniently comprise supporting fluting on the outside, against which the tension rods are braced around the circumference. This is conveniently achieved with lugs extending in the direction of the tension rods and interspersed with the tension rods, said lugs being provided on a supporting ridge extending around the edges.

The flexible bracing between the frames, and analogously preferred also the functional elements, can be achieved simply and conveniently with ceramic fiber mats which form a flexible and preferably also gas-tight interim layer at least in the area of the frames and the functional elements, preferably between the frames, between the respective frame and the functional elements braced by the frame and between the functional elements, said interim layer being used to equalize thermal expansions and additionally being used to achieve a delimitation of the functional elements against each other diagonally to their flow-through direction. As a result, chimney-like flow-through pathways delimited against each other are achieved in flow-through direction. This is not only in relation to the respective successively arranged assemblies, but also in relation to the functional elements arranged in row shape diagonal to the flow-through direction within a frame, for the purpose of which the latter are delimited from each other diagonally to direction of the rows, i.e., diagonally to the flow-through direction by means of flexible mats arranged in between, again in particular ceramic fiber mats.

This achieves a flexible bracing also in the direction of the rows, namely between sides of the respective frame facing each other, and the fixation of the position of the functional elements in the respective frame via this flexible bracing.

The insertion of the successive functional elements arranged in row form in the respective row between opposite frame sides can advantageously be achieved by means of a clamping device with which the functional elements assigned to a row are clamped together on a length in consideration of the flexibility of the flexible supports positioned between the functional elements, in particular fiber mats, said length being smaller than the distance of the opposite frame sides, between which the functional elements are ultimately supposed to be braced. This makes it possible to insert the functional elements arranged in row form between the opposite frame sides. Conveniently, overlapping supporting plates are provided overlapping to the terminal functional elements adjacent to the frame sides. Said supporting plates are preferably also braced against the respective adjacent functional elements by means of a flexible interim layer, in particular a fiber mat.

These supporting plates make it possible without a selective overload of the functional elements that the functional elements of a row can be clamped together with a simple clamping device as installation aid, in particular a clamping frame with assigned clamping elements to the point where the functional elements can be inserted diagonally to the disk plane and diagonally to the flow-through direction between the respective opposite frame sides. The insertion depth is initially limited to the exposed overlapping area of the functional elements relative to the clamping frame given by the direction of the insertion and the supporting plates covered by the functional elements. Once the functional elements are inserted between the opposite frame sides for the time being, the clamping device can be released. Next, the functional elements combined in a row can be inserted completely into the frame, essentially to the point of a flush alignment with the frame, wherein the supporting plates form sliding pads and can be coated accordingly, if necessary.

To stabilize the fiber mats positioned between the successively arranged functional elements in the direction of the rows, which may potentially also be loaded diagonally to the clamping direction in view of the flow-through that occurred diagonally to the clamping direction as well as depending on the installation situation of the exhaust gas aftertreatment system, it is convenient to provide a mat support arrangement for these fiber mats. For said arrangement, a fiber mat or a fiber mat-like cover for the mat support is preferably provided on both sides of a mat support at the transition to the respective adjacent functional element. Perforated plates or otherwise structured support means causing the interlocking of the covering fiber mats can be provided as mat supports. Furthermore, it is also possible to provide bracing of at least some of the mat supports against the frame, in particular depending on the length of the respective row of functional elements, such as for example against a tensile brace extending parallel to the respective row of functional elements between the opposite frame sides.

However, with the solution according to the disclosure, the functional elements clamped in rows between opposite frame sides are preferably not only fastened with this diagonal bracing, but also diagonally to the latter by means of the cover parts clamping together the parts of the frame which are bracing the functional elements against each other in the region of the functional elements by means of the respective fiber mats located in between, so that reinforcement is ultimately also achieved for the frame by means of the functional elements, said reinforcement resulting in high non-deformability of the encapsulating case with a lightweight design of the frames.

Preferably, the respective frames can also form parts of transfer connections between the respective exhaust gas aftertreatment units. Furthermore, said transfer connections can extend channel-like alongside the frames so that the respective transfer connection also provides helpful possibilities for the functional access to the respective exhaust gas aftertreatment units.

This way it is possible for example to supply urea for the SCR catalyst via a dosing unit provided on the outside of the respective frame, said dosing unit leading into the transfer connection to the SCR catalyst. This way, the transfer connection also achieves an adequately long mixing pathway for mixing the urea with the exhaust gas in its inflow to the SCR catalyst, and as a result the required release of ammonia. In particular in connection with the dosing unit, but possibly also separately, a hydrolysis catalyst can be provided downstream of the latter and attached accordingly on the frame, for splitting the urea supplied to the transfer connection as described above and for mixing the obtained ammonia with the exhaust gas.

Analogous to the dosing unit, a maintenance unit can also be connected with the transfer connection, possibly co-assembled with the dosing unit, wherein compressed air can be blown in via the maintenance unit onto the soot filter against the flow-through direction, whereby the supply connection used for the exhaust gas supply temporarily serves as outlet opening for the incineration ash of oil. Analogously, it is also possible to connect a regeneration burner via this supply connection if one is used, to burn off the soot accumulated on the soot filter.

BRIEF DESCRIPTION OF THE DRAWINGS

Other details and characteristics are illustrated in the drawings and the associated description. In the figures:

FIG. 5 shows a representation of an assembly corresponding to FIG. 2, wherein a mat cover is provided frontally overlapping to the edges of the frame of said assembly and the functional elements of their exhaust gas aftertreatment units, FIG. 6 shows a partially cut representation similar to the one in FIG. 3, wherein a maintenance unit is illustrated instead of the dosing unit provided in FIG. 3 on the frame side leading into a transfer connection on the frame side, FIGS. 7 and 8 show an additional schematic representation of an assembly, illustrating the exhaust gas aftertreatment units designed as oxidation catalyst, particle filter and nitrogen oxide catalyst, FIGS. 11 to 13 show different representations of a mat arrangement arranged in the transition between the functional elements of the SCR catalyst and which comprises mat supports connected with a supporting tensile restraint, FIGS. 15 and 16 show representations of a mat arrangement for fiber mats arranged between successive assemblies connected with a mat support, FIG. 17 shows an isolated representation in perspective of a mat support illustrated in FIGS. 15 and 16 having an edge protector for padding provided for the mat support, in particular fiber mats in the region of cutouts with a cross-section corresponding to the one of the exhaust gas collection channels, wherein the edge protector is formed with band-like inserts, in particular in strap shape and forms a bridging link between successive frames of assemblies in relation to the respective exhaust gas collection channel, FIG. 18 shows a section of a cross-sectional representation pertaining to FIG. 5 largely corresponding to FIG. 4, having a mixing pathway created in the transfer connection on the frame side extending from the particle filter to the SCR catalyst.

DETAILED DESCRIPTION

Figure 1:
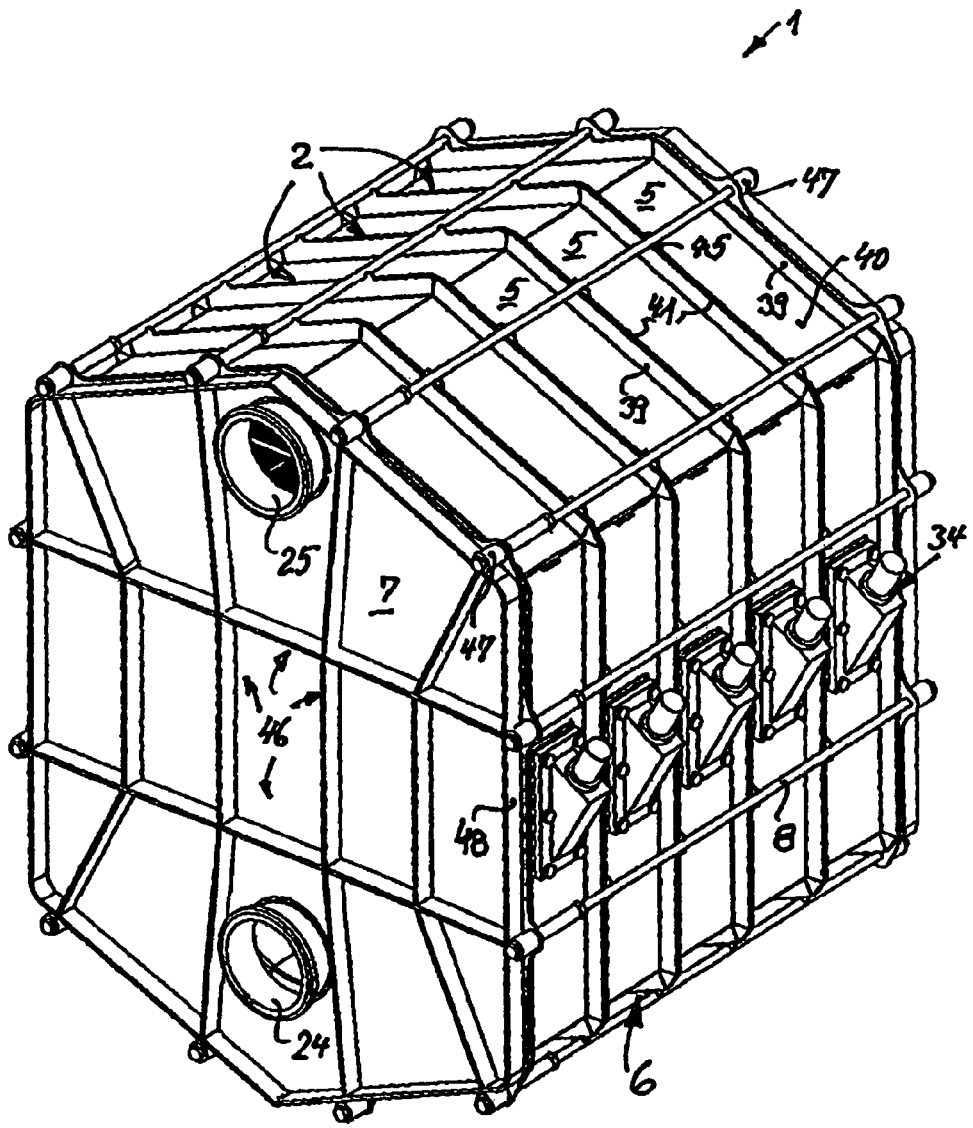
FIG. 1 shows an exterior view in perspective of an exhaust gas aftertreatment system, having a modular design consisting of disk-shaped assemblies, which in turn retain exhaust gas aftertreatment units to be traversed in the direction of the disk plane.

FIG. 1 shows a general view in perspective of an exhaust gas aftertreatment system 1, provided in particular for use in connection with internal combustion engines, and in this respect mainly for use in connection with large-volume diesel engines used for stationary and instationary purposes.

Figure 2:
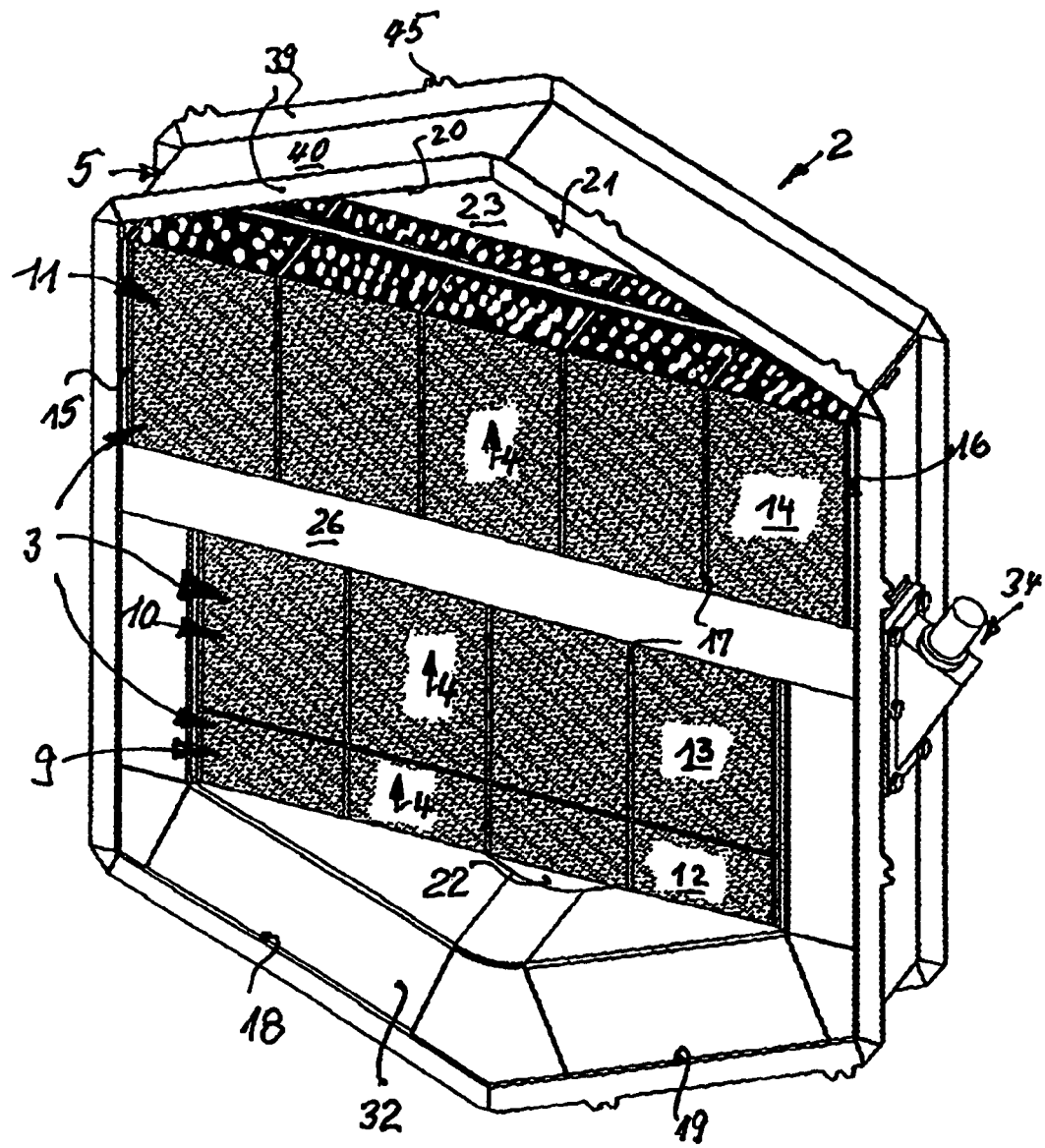
FIG. 2 shows a representation in perspective of said assembly, whose frame forms part of the case encapsulating the exhaust gas aftertreatment system and retains a plurality of exhaust gas aftertreatment units arranged in succession in the flow-through direction and set up with identical functional elements.

The exhaust gas system 1 has a modular design comprising disk-shaped assemblies 2; as generally illustrated in FIG. 2, exhaust gas flows through the exhaust gas aftertreatment units 3 it comprises, which are traversed in the direction of the disk plane. In the illustrated exemplary embodiment, the exhaust gas aftertreatment units 3 are all traversed in the same direction and the flow-through direction 4 is symbolized with corresponding arrows.

All of the assemblies 2 with identical disk-shaped design in the exemplary embodiment comprise a surrounding frame 5, which, in relation to the representation in FIG. 1, forms part of the encapsulation 6, and as a result the case formed with the frames 5 of the assemblies 2, said case being closed at the end with cover parts 7 if the frames 5 are arranged in succession diagonally to the disk plane. The disk-shaped assemblies 2 are clamped together with tension rods 8 braced against the cover parts 7.

As illustrated in FIG. 2 and additionally in particular in FIGS. 7 and 8, the disk-shaped assemblies 2 are equipped with exhaust gas aftertreatment units 3, which are formed by means of an oxidation catalyst 9, a particle filter 10 and a nitrogen oxide catalyst 11 in the exemplary embodiment in the design of a so-called SCR catalyst. The latter works with urea as reducing agent. Urea is supplied correspondingly dosed in spray form to the exhaust gas at the transition from the particle filter 10 to the nitrogen oxide catalyst 11. If necessary, the urea is split by means of a hydrolysis catalyst provided downstream of the dosing unit 34, and the ammonia generated this way is supplied to the exhaust gas in particular in the transition from the particle filter 10 to the nitrogen oxide catalyst 11.

The respective exhaust gas aftertreatment units 3 are assembled with the functional elements 12 to 14, which are preferably created from ceramic or metal substrates and have a shape that is suitable for arrangement in rows. In the illustrated exemplary embodiment, the substrates are designed in the shape of rectangular blocks, positioned between the sides 15, 16 of the frame 5 extending parallel along the flow-through direction 4 and are clamped in between said sides 15, 16. At the transition between the functional elements 12 or 13 or 14 arranged next to each other in clamping direction as well as between the functional elements adjacent to the frame sides 15, 16 and said frame sides 15, 16, ceramic fiber mats 17 are each provided as interim layers, used as flexible support for the respective block-like functional elements 12 or 13 or 14 against each other and against the frame sides 15, 16. The interim layers, here exemplified as ceramic fiber mats 17, are preferably also gas-tight so that chimney-like flow-through cross-sections separated from each other according to the cross-section of the in particular ceramic functional elements 12, or 13 or 14 are created.

According to the hexagonal circumferential outline of the encapsulation 6 and hence also the frames 5, free spaces are created between the functional elements 12 of the oxidation catalyst 9 located on the inflow and outflow sides and the functional elements 14 of the nitrogen oxide catalyst 11 as well as between each of the frame sides 18, 19 and 20, 21 connecting the roof-like covered frame sides 15, 16 arranged parallel in the flow-through direction 4, said free spaces being used as common exhaust gas channels 22, 23 of the modular, disk-shaped assemblies 2 for the exhaust gas aftertreatment system 1. The exhaust gas collection channel 22 forms the collection channel on the inflow side and the exhaust gas collection channel 23 the collection channel on the outflow side. Corresponding supply connections 24, 25 are assigned to the collection channels 22, 23 on the side of at least one of the cover parts, in the exemplary embodiment the frontal cover part 7 visible in FIG. 1. The cross-section of the exhaust gas collection channels 22, 23 can be defined with the opening angle between the respective frame sides 18, 19 and 20, 21 tilted toward each other in a roof-like shape, which is close to 140° in the exemplary embodiment, thus resulting in an obtuse-angled triangular cross-section of the respective exhaust gas collection channels 22 and 23 if the exhaust gas aftertreatment units 3 are extending alongside the frame sides 15, 16 at a right angle.

In view of the clamping of the block-like functional elements 12 to 14 between the frame sides 15, 16 arranged parallel in the flow-through direction 4, which—in relation to the Exemplary Embodiment—are relatively long compared to the frame sides 18, 19 and 20, 21 tilted toward each other in a roof-like shape and whose length corresponds to about 1.5 to 2 times the one of said frame sides 18, 19 and 20, 21 tilted toward each other in a roof-like shape, it is convenient to connect the sides of the frames 15, 16 arranged parallel in the flow-through direction 4 by means of a cross web 26 preferably positioned in the center of the longitudinal area of the frame sides 15, 16 and which extends along the transition between the particle filter 10 and the nitrogen oxide catalyst 11.

In the embodiment of the nitrogen oxide catalyst 11 as SCR catalyst, said cross web 26 can be used as separating element between two chambers 27, 28, whose one chamber 27 retains the oxidation catalyst 9 and the particle filter 10 and whose other chamber 28 retains the SCR catalyst, and as part of a transfer connection 29 via which the exhaust gases exiting the particle filter 10 are fed to the SCR catalyst 11 after the injection of urea or the addition of ammonia.

For this purpose, the cross web 26 is divided into two channel parts whose one channel part 30 is open toward the particle filter 10 and whose other channel part 31 is open toward the SCR catalyst 11 and which are connected to each other via a connecting channel 32 surrounding the chamber 27 on the frame side in such a way that the gas flowing out of the particle filter 10 onto the channel part 30 is fed to the channel part 31 open toward the SCR catalyst 11 via the connecting channel 32 on the frame side.

In terms of the design, the division of the cross web 26 into the two channel parts 30 and 31 can easily be achieved in that the cross web has an H-shaped profile, between the profiled legs of which running parallel to the disk plane the profiled web 33 is designed as a diagonal, so that opposing small-shaped channel parts 30 and 31 with rectangular cross-sections are created in the direction of the disk plane.

Figure 3:
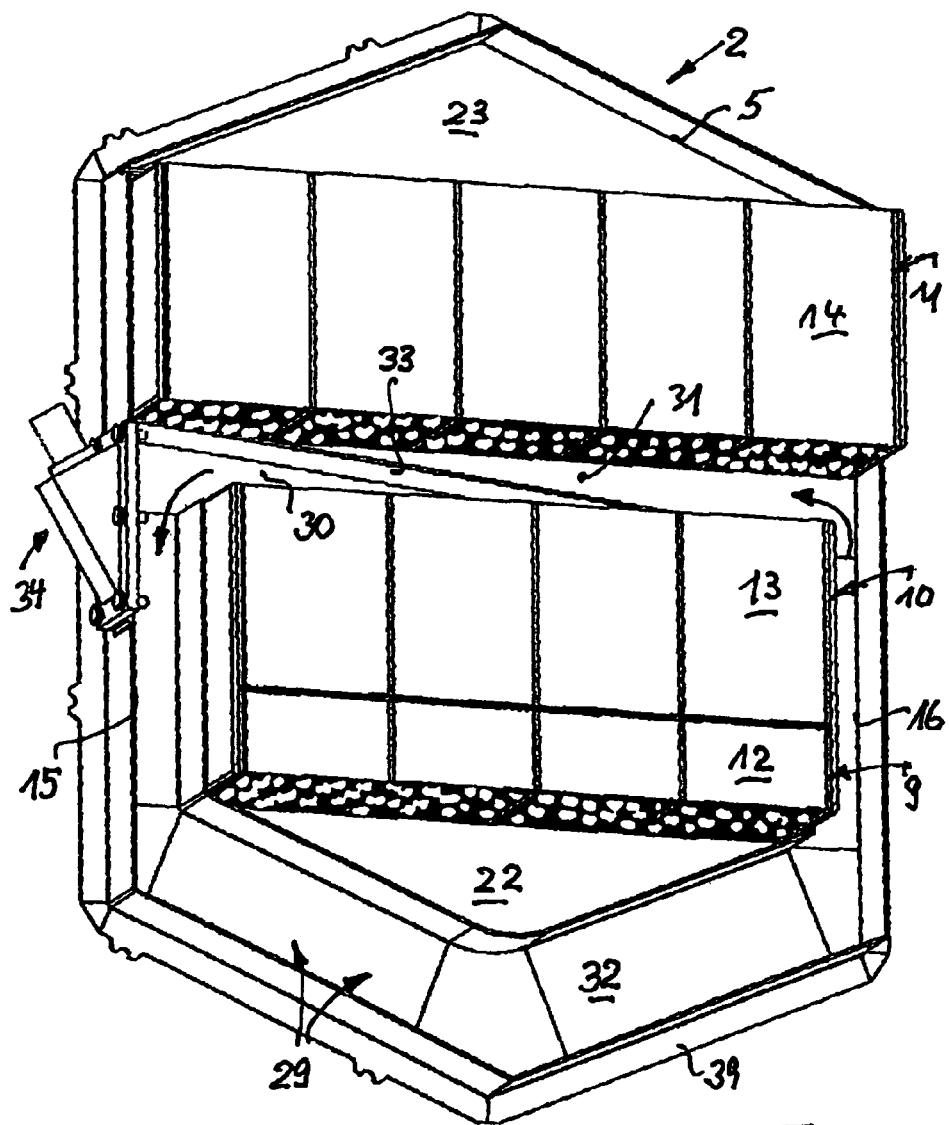
FIG. 3 shows an assembly in part illustrated cut open in the direction of its disk plane, thus illustrating the transfer connection integrated into the frame between the exhaust gas aftertreatment unit designed as soot filter and the downstream nitrogen oxide catalyst.
Figure 4:
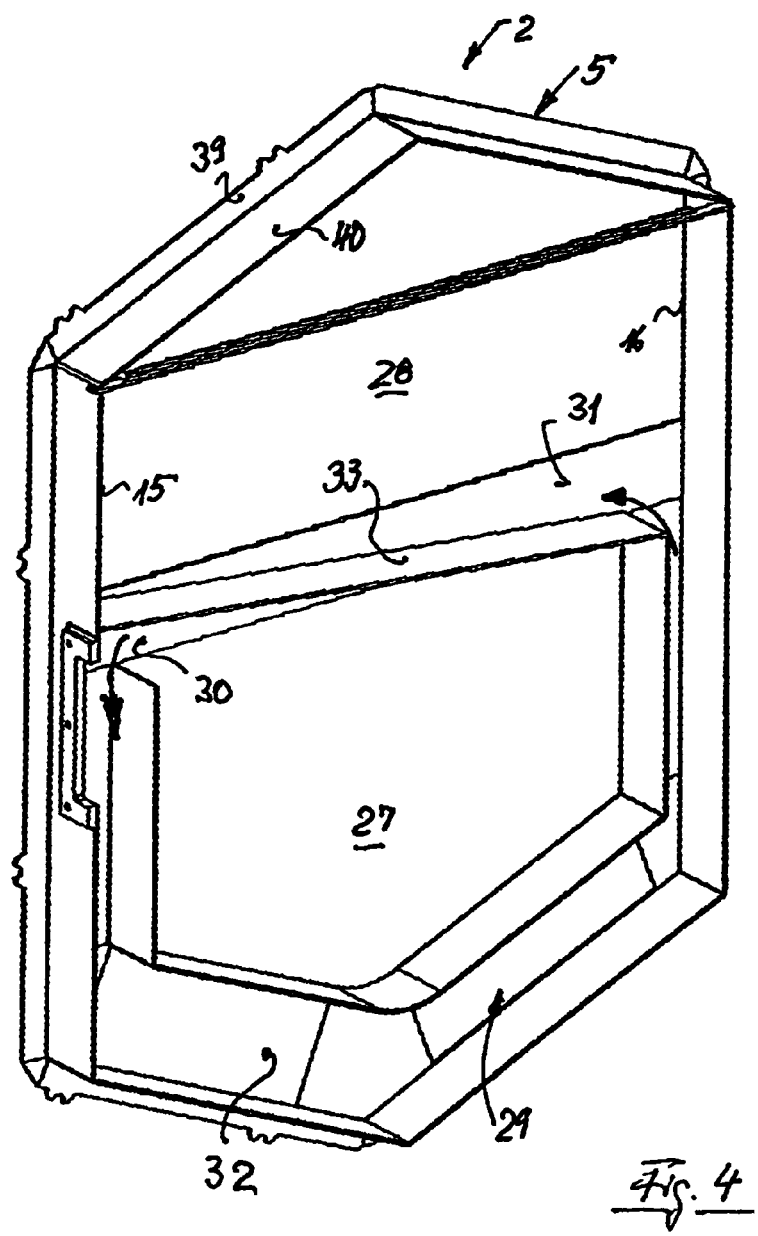
FIG. 4 shows a representation similar to FIG. 3 and simplified further in which the exhaust gas after treatment units associated with the assembly are not illustrated.
Figure 14:
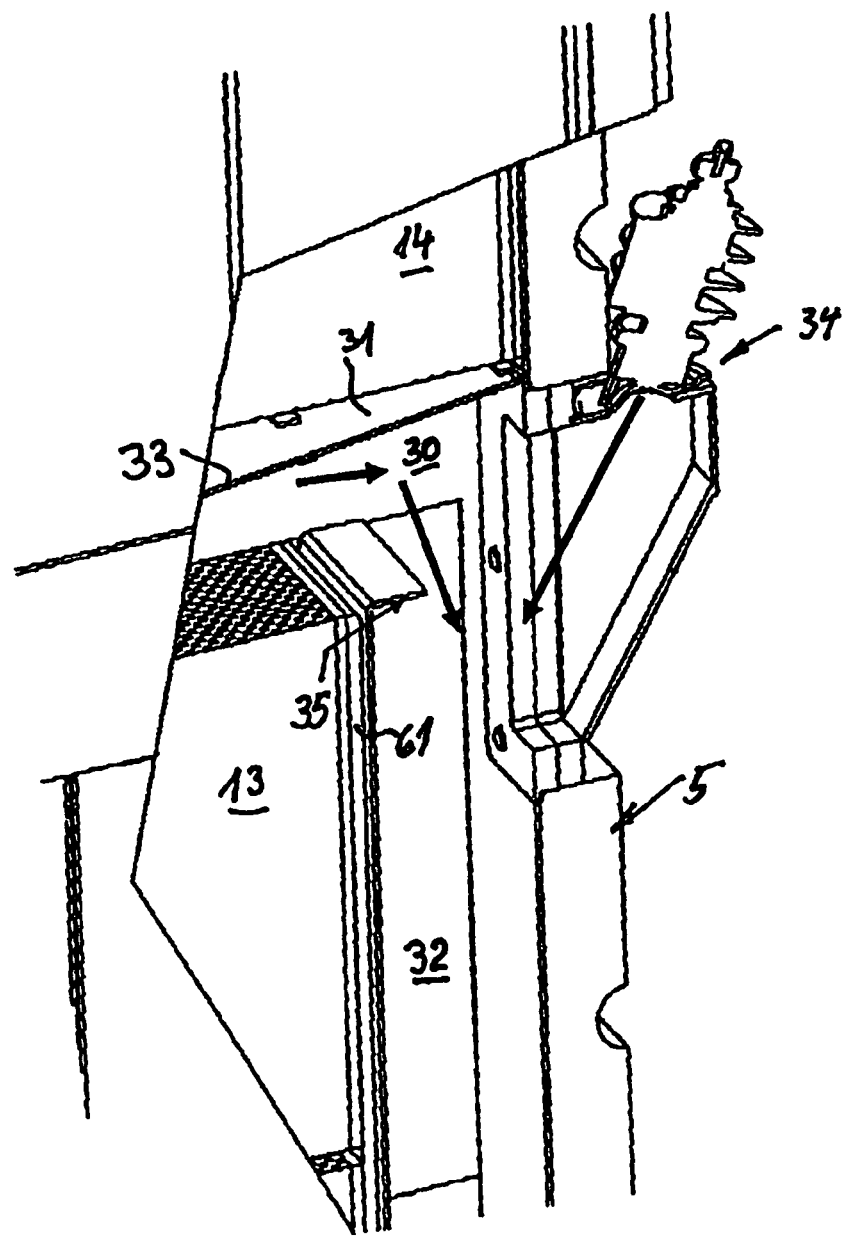
FIG. 14 shows an enlarged sectional representation of the connection of a dosing unit leading to the transfer connection from the soot filter to the SCR catalyst having a swirling insert within the transfer connection.

This is illustrated in particular also in the schematic representation of an assembly 2 cut parallel to the disk plane, which, as seen for example in FIGS. 3 and 14, illustrates a dosing unit 34 attached on the frame 5 for the injection of urea onto the transfer connection 29, in particular the connecting channel 32 in the region of the transition from the channel part 30. In particular in connection with or in assignment to the dosing unit 34, the hydrolysis catalyst can be provided in the transition to the transfer connection 29 and the mixing pathway arranged in the latter.

The transfer connection 29 is conveniently designed in such a way that a good mixture of the urea or ammonia with the exhaust gas supplied to the SCR catalyst 11 is achieved. Baffles, diversions or the like can be provided in the transfer connection 29 for this purpose. In this respect, FIG. 14 illustrates a narrowing of the gap in the transition from the channel part 30 to the connecting channel 32 by means of an indented projection 35, created for example with a swirl vane or similar. In FIG. 14, said swirl vane creating the projection 35 is formed with an end section of the shell of the connecting channel 32 bent into the cross section of the connecting channel 32 and aimed against the frame 5, said connecting channel fixed in relation to the frame 5 and surrounded by a U-shaped wall part being open toward the frame 5, or which can alternatively consist of the frame 5 itself if the latter is designed accordingly.

The transfer connection 29 as such provides favorable conditions for a "mixing pathway," i.e., for mixing urea and ammonia with exhaust gas simply because of its length and also its angled course.

In a preferred model illustrated in FIG. 18, the transfer connection 29 is created in the region of the connecting channel 32 especially in view of an intensive mixture of urea or ammonia with exhaust gas as mixing pathway 66 in that the connecting channel 32 is divided across part of its length in the cross-section and into channel sections traversed in opposite directions, in particular the channel sections 67 and 68. The diversion from the one channel section 67 to the other channel section 68 is achieved by reversing the flow-through direction in a collecting space 69, which the channel section 67 located upstream leads into and from which the channel section 68 located downstream originates. The channel sections 67 and 68 are separated by the area of a freely tapered web wall 70 at the end, which merges and extends from the inner wall 71 facing the functional elements 12, 13 of the section of the connecting channel 32 running parallel with the frame side 16 and divides the connecting channel 32 tapered toward the collecting space 69.

The web wall 70 preferably ends in the gable area 81 (FIG. 18) of the roof-shaped containment of the exhaust gas collecting channel 22, in particular in the flow-through direction on the other side of the gable, so that an angled flow path results in the inlet toward the connecting space 69. Said change of direction, and in particular the diversion of the flow direction of about 180° occurring in the transition to the channel section 68 traversed in the opposite direction results in corresponding centrifugal forces exerted onto the exhaust gas/urea and ammonia mixture, consisting of exhaust gas, vapor and possibly droplets. In particular droplet-shaped components of the exhaust gas-urea and ammonia mixture are centrifuged into the collecting space 69 in this fashion, and initially remain in the region of the mixing pathway 66 of the connecting channel 32 and usually only exit the mixing pathway 66 after they have been evaporated.

Preferably, the collecting space 69 extends to the outer wall 72 of the section of the connecting channel 32 running parallel to the frame side 15, wherein the collecting space 69 is formed by the outer cross-sectional area of the connecting channel 32 facing away from the exhaust gas collecting channel 22 on the inflow side. Said connecting channel is delimited toward the inside in the direction of the exhaust gas collecting channel 22 by means of a web wall 73. The web wall 73 has an overlapping area to the web wall 70 and delimits the channel section 68 in this overlapping area; said channel section extends to a diversion space 74 which functionally also forms a collecting space. A channel section 75 on the outflow side extends from said diversion space 74, delimited by means of the web wall 73 against the collecting space 69 and the channel section 68, said channel section extending to the area of the connecting channel 32 running parallel to the frame side 15.

As a result, an exhaust gas conduct with a mixing pathway 66 is realized, across the course of which multiple diversions with corresponding mixing effects are achieved solely based on its extension alongside the roof-like area of the connecting channel 32. Said mixing effects are amplified by the fact that the cross-section of the connecting channel 32 is divided in the region of the mixing pathway 66 into a plurality of channel sections 67, 68, 75, of which those arranged in succession are traversed in opposite directions each, hence creating hairpin-shaped diversion areas, namely in the region of a collecting space 69 and/or a diversion space 74. Because the channel sections 67, 68, 75 traversed in opposite directions via the mixing pathway 66 are realized with the cross-section of the connecting channel 32 above the mixing pathway 66 essentially remaining the same, a different flow-through speed above the mixing pathway 66 due to the different cross-sections of the channel sections and the collecting and diversion spaces is in particular also given, which has a positive effect on the corresponding treatment of the exhaust gas-urea and ammonia mixture without having a significant impact on the structural expenses as illustrated in FIG. 18.

The transition 29 can also be designed with a connection converse to the one in FIG. 18 of the mixing pathway 66 to the channel part 30 on the outflow side of the particle filter 10, and consequently the exhaust gas does not flow onto the channel section 67 in the direction of the arrow 83 as shown in FIG. 18, but in the direction of the dotted arrow 84 onto channel section 75, thus resulting in a flow-through above the mixing pathway 66 converse to the direction arrows shown in FIG. 18. Depending on the case, e.g., in view of the temperature distribution in and around the exhaust gas aftertreatment system, this may potentially be desirable.

FIG. 6 is a cross-sectional representation similar to FIG. 14 which illustrates the connection of a maintenance unit 36 essentially only implied with its attachment relative to the frame 5 instead of the dosing unit 34, wherein the maintenance unit 36 comprises a compressed air connection 37 as well as a locking flap 38. In the locked position illustrated in FIG. 6, the locking flap 38 locks the transition of the channel part 30 open toward the particle filter 10 against the channel part 31 open toward the SCR catalyst 11 in the region of the connecting channel 32, so that the particle filter 10 sketched in FIG. 6 is blown through in the opposite direction of the flow-through 4 in operating status when compressed air is admitted through the compressed air connection 37, thus cleaning it, as illustrated.

Analogously to the maintenance unit 36 or the dosing unit 34, it is possible to provide or arrange a hydrolysis catalyst used to feed ammonia to the transfer connection 29, in particular the connecting channel 32.

The maintenance unit 36 is combined into a working unit with the dosing unit 34 and/or the hydrolysis catalyst, so that no redesigning measures are required for the maintenance. In said model, the locking flap 38 can be designed in such a way that it can be used depending on the position for swirling and mixing the injected urea with the exhaust gas during normal operation.

FIGS. 1 and 2 illustrate for example the design of the frames 5 of the disk-shaped assemblies 2 with edges 39 set up toward the outside, so that the respective frame sides are represented as U-shaped profiles open toward the outside of the frames having webs 40 arranged between the edges 39 extending diagonally to the disk plane. Hence, the frames 5 have a design which can be manufactured in an advantageous manner and with low expenses also using sheet metal with low welding requirements, for example using steel strip material. The edges 39 set up for example by means of bending also create reinforcement ridges, making it is possible to work with relatively low material thicknesses.

In the modular assembled exhaust gas aftertreatment system 1, the disk-shaped assemblies 2 are supported against each other via their edges 39, wherein a flexible and sealing interim layer 41 is provided between the edges of successive assemblies 2.

Said interim layer 41 in turn is preferably created with a strip of a fiber mat 17.

FIG. 5 illustrates that the strips arranged between the edges 39 as interim layer 41 are created with edge zones of fiber mats, as illustrated for a fiber mat 17 as pad 42 running parallel to the disk plane, covering the assembly 2 in the region of the exhaust gas aftertreatment units 3 and the edges 39.

The pad 42 in particular created with a fiber mat forms a flexible sealing strip arranged diagonal to the direction of pull of the tension rods 8 in the region of the edges 39 as interim layer 41 and additionally also a gas-tight delimitation between successive assemblies 2 in the region of the extensive cover to the exhaust gas aftertreatment units 3, said delimitation being cut out in the cover area of the exhaust gas collection channels 22, 23.

In a convenient model of this basic design, it is also possible according to FIGS. 15 and 16 to provide a mat arrangement 44 with a mat support 43 instead of the fiber mat 17 creating an interim layer 41 and a pad 42, said mat support having a large area and comprising an interim layer 41 on the edge side matching the fiber mats and, surrounded by the interim layer comprising a surface positioned overlapping the exhaust gas aftertreatment units 3 and corresponding to the pad 42. In the region of said surface 42, the mat support 43 preferably has a punched or otherwise structured design.

Preferably, the mat support 43 forms an assembly together with the overlapping fiber mats—or other correspondingly flexible and sealing covers, similar to a cylinder head seal, which as a whole is inserted between two adjacent assemblies 2 each and can be clamped in between the latter. In particular in connection with said mat arrangement 44 reinforced with mat supports 43, for which it is also possible to use mat supports 43 with a different design, a high lateral stability is also achieved for larger exhaust gas aftertreatment systems 1 with the mutual bracing of the assemblies 2 against each other. This way, the stability of the exhaust gas aftertreatment 1 can also be guaranteed under difficult conditions, such as with vibration exposure, impact exposure when used in vehicles or similar by means of only axial bracing of the assemblies 2 against each other via tension rods 8 propped up on the cover side. Axially, the tension rods 8 are only propped up against the cover parts 7 do not cross the clamped-together assemblies 2 in the illustrated exemplary embodiment. Conveniently, the tension rods 8 extend across the assemblies 2, if necessary—as shown—with lateral bracing of the tension rods 8 against the assemblies 8 via small trestles 45, which are conveniently created with projections provided on and indented beyond the edges 39, such as illustrated for example in FIGS. 1 and 2.

FIG. 5 as well as FIGS. 15 and 16 illustrate ceramic fiber mats 17, clamped as pads 42 between frames 5 and functional elements 12, 14 of successive assemblies 2 clamped against each other—with or without mat supports 43. The mats 17 and pads 42 have cut-outs 76, 77 matching the cross-sections of the exhaust gas collection channels 22, 23 with edges surrounding the exhaust gas collection channels 22, 23. To protect these edges, for example against the admission of exhaust gases or exhaust gas-urea or exhaust gas-ammonia mixtures flowing into the functional elements 12, flowing out of the functional elements 14 and/or flowing in the exhaust gas collection channels 22, 23, a screen or cover has been proven convenient for the edges, said screen or cover also forming a protective bridge 82 in the transition between successive assemblies 2.

Said bridging cover can be provided on the side of the frames 5 or, with respect to embodiments according to FIGS. 15 and 16, also on the side of the mat supports 43, as shown in a schematic representation in FIG. 17 in correlation with a mat support 43. In view of the disk-shaped assemblies 2 relative to the thickness and the corresponding width of the frames measured diagonally to the disk plane, the fiber mats 17 which are vulnerable in the edge area only have a low thickness and hence only small covers are required as screens.

When fixed opposite the frames 5, they can be formed with band-like inserts 78, which—as shown in FIG. 17—are preferably shaped as a strap following the outline of the exhaust gas collection channels 22, 23, the sides of said strap facing each other in a roof-shaped fashion being fixed against the corresponding frame sides 18, 19 and 20, 21, and its opposite long side, if necessary reinforced with supports extending in the direction of the disk plane, running overlapping along the edge of the fiber mat 17 extending alongside the functional elements 12, 14.

With respect to solutions according to FIGS. 15 and 16 with a fiber mat support 43, the latter can, as shown in FIG. 17, comprise a band-shaped insert 78 (FIG. 17) surrounding the respective exhaust gas collection channel 22, 23, said insert being designed as a triangular strap 79, 80 to match the shape of the cut-outs 76, 77 (FIG. 16) following the triangular shape of the exhaust gas collection channel 22, 23.

Analogous to a T-profile, the large-area mat support 43, made in particular from sheet metal, forms the support web in this solution, on which the band-shaped insert bent into a strap 79 or 80 is attached as a flange. Accordingly, the band-shaped insert 78 protrudes the width of the large-area mat support 43 as "support web" on both sides and therefore overlaps the edges surrounding the respective cut-out 76, 77 of the fiber mats provided on the mat support 43 as pads 42.

In said solution, the strap 79, 80 created with a band, in particular a flat material, can easily be fixed to the mat support 43 by means of welding. However, other designs are also possible which analogously form a cover of the edges of the pad 42 otherwise exposed to the exhaust gas collection channels 22, 23, which can preferably be created with fiber mats, mainly ceramic fiber mats. Furthermore, it is also possible to use pads 42 with a different design, as long as the function of the pads corresponds to those of the fiber mats, i.e., they are at least essentially gas-tight and flexibly ductile in the clamping direction of the assemblies 2.

In connection with a band-shaped insert 78, in particular designed in the form of a strap 79 or 80, the insert 78 forms a bridging link between successive assemblies 2 in relation to an installed exhaust gas aftertreatment system 1, so that the respective exhaust gas collection channel 22, 23 is depicted delimited toward the outside by the frames 5 of the assemblies 2 and the bridging, band-shaped inserts 78.

This is analogously also true if the band-shaped inserts 78—not shown—are fixed on the frames 5 and on the sides diagonally to the frame plane protruding beyond them as far as required to create a cover of the mats positioned between successive frames 5. In a simple fashion, the band-shaped inserts 79 can also be fixed, in particular welded, onto the edge side of the frames 5 for this purpose protruding against their inner circumference, so that a respective bridging between the frames 5 of successive assemblies is also achieved in this way.

Furthermore, FIG. 1 also shows a ribbing arrangement 46 for the flat, relatively large-size cover parts 7 with ribs extending toward lugs 47. The lugs 47 are provided around the circumference or a rib 48 enclosing the edges for the respective cover part 7 and create the cover side bracing for the tension rods 8, which extend diagonally across the assemblies 2 alongside the exhaust gas aftertreatment system 1.

Figure 9:
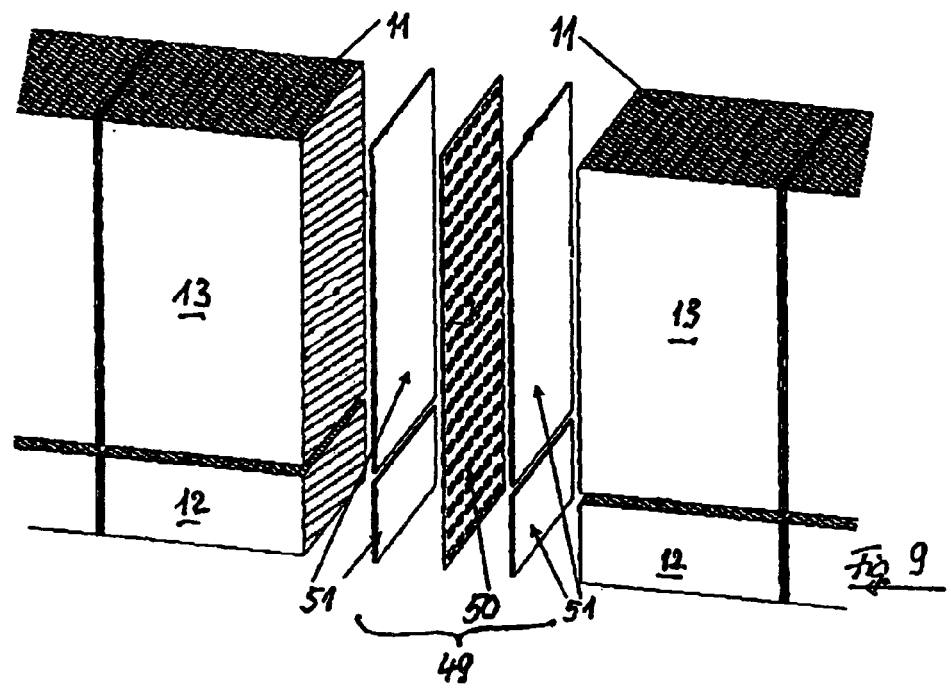
FIG. 9 shows an exploded view of a mat arrangement between identical functional elements of an exhaust gas aftertreatment unit arranged in a row.

Analogously to the mat arrangement 44 between successive assemblies 2, a mat arrangement 49 having a mat support 50 and ceramic fiber mats 51 arranged on both sides of the latter can also be provided between block-like functional elements 12 or 13 or 14 arranged in succession in the disk plane and clamped between the frame sides 15 and 16—only illustrated for the functional elements 12 and 13—as illustrated schematically in FIG. 9. At hand, the mat support 50 can also be created with a perforated plate or a different large-area element with structuring, used for bracing the ceramic fiber mats 51. Said design with clamping between the frame sides 15, 16 in connection with the bracing and clamping via the cover parts 7 achieves the further stabilization of the respective exhaust gas aftertreatment units 3, in particular designed with ceramic substrates as functional elements, including in consideration of the pulsating admission of exhaust gases in internal combustion engines and/or impact-like acceleration forces acting on the exhaust gas aftertreatment system 1.

FIGS. 11 to 13 show an update of this principle, which can be convenient in particular with larger bearing distances of the exhaust gas aftertreatment units 3 clamped between the frame sides 15, 16 in the direction of the disk plane. The tensile clamping between opposite frame sides 15, 16 provided in said embodiment is also advantageous to be able to apply relatively high tension forces onto the functional elements clamped between the frame sides 15, 16, here the functional elements 14 of the nitrogen oxide catalyst 11 created with ceramic or metal substrates with a design of the frame 5 as lightweight as possible and without deforming the latter.

The tensile clamping 52 is illustrated in FIG. 11 with a flat rod 53, which extends between the frame sides 15, 16 and is braced against them, wherein the flat sides of the flat rod 53 are positioned diagonally to the flow-through direction 4, hence giving the rod a certain degree of flexibility in the flow-through direction 4.

Furthermore, FIGS. 11 to 13 illustrate a mat arrangement 54 between the pressure-sensitive substrates forming the functional elements 14 of the nitrogen oxide catalyst 11 clamped between the frame sides 15, 16, having mat supports 55 and ceramic fiber mats 56 as flexible interim layers abutting against the mat supports 55 on both sides, with a stabilizing connection via mat support 55, so that additional supporting bracing is achieved for the functional elements 14 by means of the connection of the mat supports 55 with the flat rod 53 illustrated in particular in FIG. 12. For the connection with the flat rod 53, the mat supports 55 are equipped with exposed clips 57 on the front side facing the flat rod 53, used to fix the mat supports 55 to the flat rod 53 for example with screwed connections 58.

Said connection of the mat supports 55 detachable from the supporting tensile clamping 52 created with the flat rod 53 is convenient for clamping the functional elements, here the functional elements 14 into the enclosed frame between its frame sides 14, 15.

Figure 19:
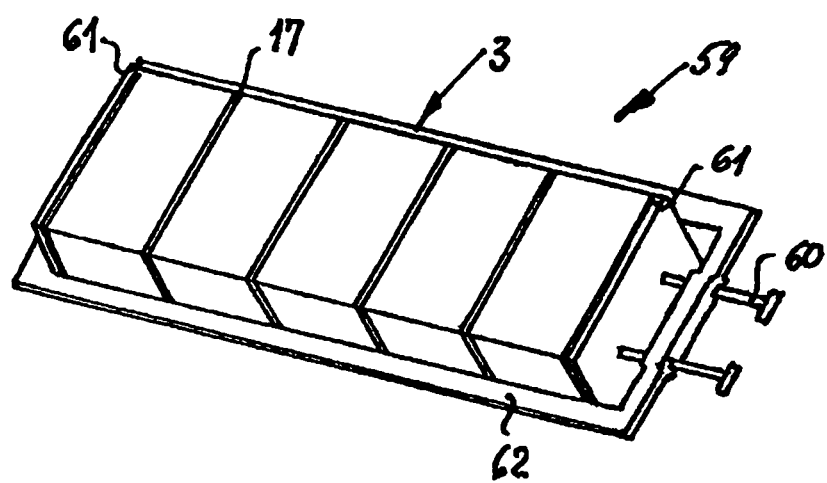
FIG. 19 shows a simplified and schematic representation of a clamping device by means of which a respective exhaust gas aftertreatment unit can be inserted into the frame of the associated assembly.

FIG. 19 illustrates a clamping and installation procedure for functional elements flexibly braced against each other, for example functional elements 12, which are flexibly braced against each other via ceramic fiber mats 17 and which need to be pushed together to a length shorter than the distance between the frame sides 15, 16 measured in the clamping direction to be inserted between the frame sides 15, 16.

The clamping assembly 59 illustrated in FIG. 19 has an enclosed clamping frame 62, which encompasses the functional elements of the exhaust gas aftertreatment unit 3 to be inserted between the frame sides 15, 16 in clamping direction and applies them in clamping direction via corresponding clamping elements 60, illustrated as clamping screws. For this purpose, the package of functional elements representing an exhaust gas aftertreatment unit 3 each, i.e., for example of the functional elements 12, is covered with a dimensionally stable bolster plate 61 on the sides facing each other in clamping direction, so that the respective package of functional elements can be pushed together to an insertion length shorter than the distance between the frame sides 15, 16 by means of the clamping elements 60.

This way, the respective exhaust gas aftertreatment unit 3 can initially be inserted into the frame 5 via the plane of the clamping frame 62 diagonally to the frame plane 5 between the frame sides 15, 16 according to the projection of the compressed exhaust gas aftertreatment unit 3 and the clamping assembly 59 can then be released based on the bracing against the frame sides 15, 16 achieved this way.

Furthermore, the dimensionally stable bolster plates 61 create the support for the functional elements 12 positioned in between and flexibly braced against each other, which can now be inserted together—i.e., as a package—into the frame 5 with the bolster plates 62 braced against the frame sides 15, 16, so that the frame with the exhaust gas aftertreatment units 3 forms the desired, disk-shaped assembly 2. As discussed in connection with FIGS. 11 to 13, the intended screwed connection 58 with the tensile clamping 52 can be created in the inserted status, to the extent such an additional support is given for the respective exhaust gas aftertreatment unit.

In particular if the exhaust gases are fed to the individual functional elements of the exhaust gas aftertreatment units 3 diagonally to the flow-through direction 4, especially the block-like functional elements 12 of the oxidation catalyst 9 arranged successively in a row and the functional elements 14 of the nitrogen oxide catalyst 11, it is convenient to make provisions to achieve an admission of exhaust gas with essentially identical mass for the respective functional elements 12 and 14, irrespective of the respective inflow conditions. Corresponding conduction facilities can be provided for this purpose.

Figure 10:
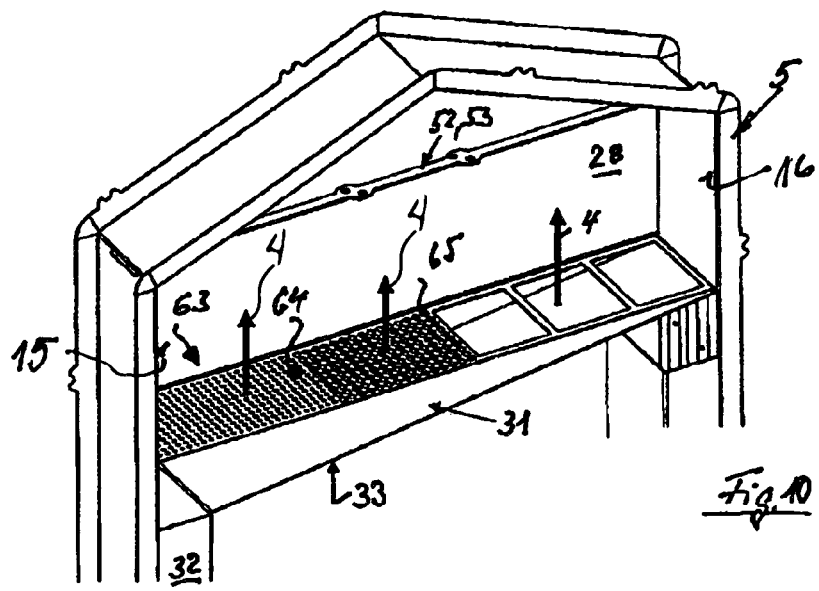
FIG. 10 shows a simplified partial representation of an assembly in which the transition of the transfer connection onto the chamber retaining the not illustrated SCR catalyst is illustrated with its perforated plates used for the uniform distribution of the exhaust gas flow onto the functional element.

A particularly convenient solution comprises—as illustrated in FIG. 10, but also visible in FIG. 12—providing an arrangement limiting the transfer cross-section onto the functional element in the inflow side cover of the functional elements for example and in particular in the form of a conduction cover 63, created with perforated plates 64. The perforated plates 64 are conveniently provided with holes 65, i.e., penetrable openings, with their area matching the respective inflow conditions. For example, the holes 65 with respect to FIG. 10 are smaller in the inflow side section of the channel part 31 to which the full amount of exhaust gas is admitted, compared to the successive areas of the conducting cover 63, so that an essentially identical admission of the functional elements is achieved with simple means, which are created with the not illustrated functional elements 14 of the nitrogen oxide catalyst 11 arranged in the chamber 28 with respect to the representation according to FIG. 10.

The invention claimed is:

1. An exhaust gas aftertreatment system, having supply connections on a capsule side and being designed modular with disk-shaped assemblies, connected in succession diagonally to a disk plane and comprising traversed exhaust gas aftertreatment units arranged in the direction of the disk plane, which are positioned between collecting channels in relation to the flow-through direction of the assemblies running in the direction of the disk plane, said collecting channels being integrated into the assemblies, extending diagonally to the disk planes across the full length of the assemblies and being open toward the supply connections,
   wherein the exhaust gas after treatment units of one of the disk-shaped assemblies are arranged in rows running diagonally to the one of the disk-shaped assemblies flow-through direction, said rows being arranged in succession in the flow-through direction of the one of the disk-shaped assemblies.

2. The exhaust gas aftertreatment system according to claim 1,
   wherein exhaust gas aftertreatment units with different functions are arranged in succession in the disk-shaped assemblies in flow-through direction.

3. The exhaust gas aftertreatment system according to claim 1,
   wherein the disk-shaped assemblies each comprise a chamber on an inflow side as well as a chamber on an outflow side, which retain exhaust gas aftertreatment units of different functions as functional elements and are connected by a transfer connection.

4. The exhaust gas aftertreatment system according to claim 1,
   wherein functional elements assigned to at least one of the disk-shaped assemblies comprise at least one of an oxidation catalyst, a particle filter and a nitrogen oxide catalyst.

5. The exhaust gas aftertreatment system according to claim 3, wherein the chamber on the inflow side retains an oxidation catalyst and a particle filter as functional elements.

6. The exhaust gas aftertreatment system according to claim 3,
wherein the chamber on the outflow side retains a nitrogen oxide catalyst as functional element, said catalyst being supplied with flow via the transfer connection.

7. The exhaust gas aftertreatment system according to claim 6,
wherein a nitrogen oxide catalyst is a Selective Catalytic Reduction (SCR) catalyst and is connected to a urea supply line via a dosing unit or to a hydrolysis catalyst downstream of a dosing unit via the transfer connection.

8. The exhaust gas aftertreatment system according to claim 3,
wherein at least one of the disk-shaped assemblies comprises a frame creating an encapsulation and the transfer connection is at least partially created by a channel running within the frame or alongside the frame.

9. The exhaust gas aftertreatment system according to claim 8,
wherein a transfer connection is provided around the circumference of the chamber on the inflow side.

10. The exhaust gas aftertreatment system according to claim 8,
wherein the chamber on the inflow side is separated from the chamber on the outflow side by a crossbeam of the frame positioned between the channel of the transfer connection exiting from the chamber on the inflow side and leading onto the chamber on the outflow side.

11. The exhaust gas aftertreatment system according to claim 10,
wherein the transfer connection comprises a connecting channel which runs between channel parts separated by a web around a circumference of the chamber on the inflow side.

12. The exhaust gas aftertreatment system according to claim 6,
wherein the transfer connection comprises a connection for a maintenance unit.

13. The exhaust gas aftertreatment system according to claim 12,
wherein a dosing unit and the maintenance unit are arranged in an exchangeable manner or designed as assembly.

14. The exhaust gas aftertreatment system according to claim 7,
wherein the transfer connection is designed as mixing pathway.

15. The exhaust gas aftertreatment system according to claim 14,
wherein the transfer connection is in a region of the connecting channel.

16. The exhaust gas aftertreatment system according to claim 3,
wherein the functional elements successively arranged in the disk plane diagonally to the flow-through direction have a block-like design.

17. The exhaust gas aftertreatment system according to claim 3,
wherein the functional elements successively arranged in the disk plane of the one of the disk-shaped assemblies diagonally to the flow-through direction are braced against each other with interim layers.

18. The exhaust gas aftertreatment system according to claim 3,
wherein the functional elements of successive disk shaped assemblies are braced against each other diagonally to the flow-through direction of the assemblies using interim layers.

19. The exhaust gas aftertreatment system according to claim 18,
wherein the functional elements corresponding to each other of the successive disk shaped assemblies are braced against each other diagonally to the flow-through direction of the assemblies by interim layers.

20. The exhaust gas aftertreatment system according to claim 17,
wherein the interim layers have a flexible design.

21. The exhaust gas aftertreatment system according to claim 17,
wherein the interim layers have a gas-tight design.

22. The exhaust gas aftertreatment system according to claim 17,
wherein fiber mats are provided as interim layers.

23. The exhaust gas aftertreatment system according to claim 17,
wherein the interim layers comprise fiber mats and fiber mat supports.

24. The exhaust gas aftertreatment system according to claim 17,
wherein flow-through pathways separated against each other in a chimney-like design are created through the interim layers for functional elements successively arranged in flow-through direction.

25. The exhaust gas aftertreatment system according to claim 17,
wherein the functional elements are clamped in a row between opposite sides of a frame extending in flow-through direction.

26. The exhaust gas aftertreatment system according to claim 17,
wherein successive disk shaped assemblies are each separated from each other and braced against each other by integrated fiber mats in the area of a frame and the functional elements.

27. The exhaust gas aftertreatment system according to claim 17,
wherein a covering bridge-over is assigned to edges exposed toward exhaust gas channels of the interim layers at a transition between successive disk shaped assemblies.

28. The exhaust gas aftertreatment system according to claim 3,
wherein at least in part, coverings comprising perforated plates are provided for the functional elements which are delimiting their free inflow cross-section-upstream on a face.

29. The exhaust gas aftertreatment system according to claim 1,
wherein the exhaust gas aftertreatment system is modular with disk-shaped assemblies comprising cover parts on an end side and that the disk-shaped assemblies arranged in between are clamped together by cover parts clamped by tension rods.

30. The exhaust gas aftertreatment system according to claim 29,
wherein the tension rods follow an overlapping course to frames.

* * * * *

UNITED STATES PATENT AND TRADEMARK OFFICE
CERTIFICATE OF CORRECTION

| | | |
|---|---|---|
| PATENT NO. | : 9,140,160 B2 | |
| APPLICATION NO. | : 13/264820 | |
| DATED | : September 22, 2015 | |
| INVENTOR(S) | : Marc Hehle et al. | |

It is certified that error appears in the above-identified patent and that said Letters Patent is hereby corrected as shown below:

Title Page

Item (75), "Inventors" the city "Constance" is incorrect and should be deleted.

The city should read "Konstanz".

Signed and Sealed this
Seventh Day of June, 2016

Michelle K. Lee
*Director of the United States Patent and Trademark Office*